United States Patent
Kamikawabata et al.

(10) Patent No.: US 11,923,130 B2
(45) Date of Patent: Mar. 5, 2024

(54) LAMINATED CORE AND ELECTRIC MOTOR

(71) Applicant: NIPPON STEEL CORPORATION, Tokyo (JP)

(72) Inventors: Masahito Kamikawabata, Tokyo (JP); Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 457 days.

(21) Appl. No.: 17/312,103

(22) PCT Filed: Dec. 17, 2019

(86) PCT No.: PCT/JP2019/049292
§ 371 (c)(1),
(2) Date: Jun. 9, 2021

(87) PCT Pub. No.: WO2020/129940
PCT Pub. Date: Jun. 25, 2020

(65) Prior Publication Data
US 2022/0028608 A1     Jan. 27, 2022

(30) Foreign Application Priority Data
Dec. 17, 2018   (JP) ................... 2018-235859

(51) Int. Cl.
*H02K 1/18*      (2006.01)
*H01F 27/245*    (2006.01)
(Continued)

(52) U.S. Cl.
CPC ....... *H01F 41/0233* (2013.01); *H01F 27/245* (2013.01); *H02K 1/18* (2013.01);
(Continued)

(58) Field of Classification Search
CPC .. H01F 41/0233; H01F 41/0206; H01F 41/02; H01F 27/245; H01F 27/24;
(Continued)

(56) References Cited

U.S. PATENT DOCUMENTS 3,386,058 A    5/1968   Michel
4,025,379 A    5/1977   Whetstone
(Continued)

FOREIGN PATENT DOCUMENTS

CN       102792556 A    11/2012
EP        3553799 A1    10/2019
(Continued)

OTHER PUBLICATIONS

Datasheet of Nylon 6, Cast (Year: N/A, Printed Jun. 28, 2023).
(Continued)

*Primary Examiner* — Michael Andrews
(74) *Attorney, Agent, or Firm* — Renner, Otto, Boisselle & Sklar, LLP

(57) ABSTRACT

A laminated core includes: a plurality of electrical steel sheets stacked in a thickness direction, wherein the electrical steel sheet includes an annular core back part and a plurality of tooth parts protruding from the core back part toward a radial direction and arranged at intervals in a circumferential direction of the core back part, and wherein among the plurality of electrical steel sheets, the tooth parts of the electrical steel sheets located at one side on the outside in a stacking direction are adhered to each other by an adhesion part provided between the tooth parts adjacent to each other in the stacking direction, the tooth parts of the electrical steel sheets located at the other side on the outside in the stacking direction are adhered to each other by an adhesion part provided between the tooth parts adjacent to each other in the stacking direction, and the tooth parts of the electrical (Continued)

steel sheets located at a center part in the stacking direction are not adhered to each other.

10 Claims, 5 Drawing Sheets

(51) Int. Cl.
  *H01F 41/02* (2006.01)
  *H02K 1/27* (2022.01)
(52) U.S. Cl.
  CPC ............ *H02K 1/27* (2013.01); *H02K 2201/09* (2013.01); *H02K 2213/03* (2013.01)
(58) Field of Classification Search
  CPC ............ H02K 1/18; H02K 1/185; H02K 1/27; H02K 1/12; H02K 1/16; H02K 2201/09; H02K 2213/03
  USPC ..................................... 310/216.048, 216.016
  See application file for complete search history.

(56) References Cited

U.S. PATENT DOCUMENTS

| | | | |
|---|---|---|---|
| 4,103,195 A | 7/1978 | Torossian | |
| 4,413,406 A | 11/1983 | Bennett | |
| 5,142,178 A | 8/1992 | Kloster et al. | |
| 5,248,405 A | 9/1993 | Kaneda et al. | |
| 5,338,996 A | 8/1994 | Yamamoto | |
| 5,448,119 A | 9/1995 | Kono et al. | |
| 5,994,464 A | 11/1999 | Ohsawa et al. | |
| 6,495,936 B2 | 12/2002 | Kikuchi et al. | |
| 6,653,758 B2 | 11/2003 | Tsuneyoshi et al. | |
| 7,298,064 B2 | 11/2007 | Yamamoto | |
| 7,562,439 B2 | 7/2009 | Yamamoto | |
| 7,859,163 B2 | 12/2010 | Bertocchi et al. | |
| 7,952,254 B2 | 5/2011 | Cho et al. | |
| 8,015,691 B2 | 9/2011 | Miyake | |
| 8,581,468 B2 | 11/2013 | Kudose et al. | |
| 8,697,811 B2 | 4/2014 | Kishi et al. | |
| 9,331,530 B2 | 5/2016 | Jang et al. | |
| 9,512,335 B2 | 12/2016 | Hoshi et al. | |
| 9,770,949 B2 | 9/2017 | Fudemoto et al. | |
| 10,340,754 B2 | 7/2019 | Ogino et al. | |
| 10,348,170 B2 | 7/2019 | Izumi et al. | |
| 10,491,059 B2 | 11/2019 | Murakami et al. | |
| 10,547,225 B2 | 1/2020 | Hattori et al. | |
| 10,574,112 B2 | 2/2020 | Tomonaga | |
| 10,819,201 B2 | 10/2020 | Thumm et al. | |
| 10,840,749 B2 | 11/2020 | Chaillou et al. | |
| 11,056,934 B2 | 7/2021 | Kubota et al. | |
| 11,616,407 B2 | 3/2023 | Hino et al. | |
| 11,710,990 B2* | 7/2023 | Ohsugi ..................... H01F 3/02 310/216.004 | |
| 2002/0047459 A1 | 4/2002 | Adaeda et al. | |
| 2004/0056556 A1 | 3/2004 | Fujita | |
| 2004/0124733 A1 | 7/2004 | Yamamoto et al. | |
| 2006/0043820 A1 | 3/2006 | Nakahara | |
| 2007/0040467 A1 | 2/2007 | Gu | |
| 2007/0182268 A1 | 8/2007 | Hashiba et al. | |
| 2009/0026873 A1 | 1/2009 | Matsuo et al. | |
| 2009/0195110 A1* | 8/2009 | Miyake ................ H02K 15/022 310/216.058 | |
| 2009/0230812 A1 | 9/2009 | Cho et al. | |
| 2010/0090560 A1 | 4/2010 | Myojin | |
| 2010/0197830 A1 | 8/2010 | Hayakawa et al. | |
| 2010/0219714 A1 | 9/2010 | Abe et al. | |
| 2010/0244617 A1 | 9/2010 | Nobata et al. | |
| 2011/0180216 A1 | 7/2011 | Miyake | |
| 2011/0269894 A1 | 11/2011 | Miyamoto | |
| 2012/0088096 A1 | 4/2012 | Takeda et al. | |
| 2012/0128926 A1 | 5/2012 | Ohishi et al. | |
| 2012/0156441 A1 | 6/2012 | Gerster | |
| 2012/0235535 A1 | 9/2012 | Watanabe | |
| 2012/0288659 A1 | 11/2012 | Hoshi et al. | |
| 2013/0244029 A1 | 9/2013 | Igarashi et al. | |
| 2014/0023825 A1 | 1/2014 | Igarashi et al. | |
| 2015/0028717 A1 | 1/2015 | Luo et al. | |
| 2015/0097463 A1 | 4/2015 | Blocher et al. | |
| 2015/0130318 A1 | 5/2015 | Kitada et al. | |
| 2015/0256037 A1* | 9/2015 | Kudose ..................... H02K 3/30 310/45 |
| 2015/0337106 A1 | 11/2015 | Kajihara | |
| 2016/0023447 A1 | 1/2016 | Shimizu | |
| 2016/0352165 A1 | 12/2016 | Fubuki | |
| 2017/0117758 A1 | 4/2017 | Nakagawa | |
| 2017/0287625 A1 | 10/2017 | Ito | |
| 2017/0342519 A1 | 11/2017 | Uesaka et al. | |
| 2018/0030292 A1 | 2/2018 | Gotou | |
| 2018/0056629 A1 | 3/2018 | Hamamura | |
| 2018/0159389 A1* | 6/2018 | Nishikawa .............. H02K 1/148 |
| 2018/0212482 A1 | 7/2018 | Nigo | |
| 2018/0295678 A1 | 10/2018 | Okazaki et al. | |
| 2018/0309330 A1 | 10/2018 | Ueda | |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0048499 A1 | 2/2020 | Andou et al. | |
| 2020/0099263 A1 | 3/2020 | Hirosawa et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |

(56) References Cited

FOREIGN PATENT DOCUMENTS

| | | |
|---|---|---|
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-011863 A | 1/2017 |
| JP | 2017-0055906 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan, RM-92-79, 1992.
Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

* cited by examiner

LAMINATED CORE AND ELECTRIC MOTOR

TECHNICAL FIELD

The present invention relates to a laminated core and an electric motor.

Priority is claimed on Japanese Patent Application No. 2018-235859, filed Dec. 17, 2018, the content of which is incorporated herein by reference.

BACKGROUND ART

Conventionally, a laminated core described in Patent Document 1 below is known. In this laminated core, electrical steel sheets adjacent to each other in a stacking direction are adhered.

CITATION LIST

Patent Document

[Patent Document 1]
Japanese Unexamined Patent Application, First Publication No. 2015-136228

SUMMARY OF THE INVENTION

Problems to be Solved by the Invention

In the conventional laminated core, there is room for improvement in magnetic properties.

The present invention has been made in view of the aforementioned circumstances and an object of the present invention is to improve magnetic properties.

Means for Solving the Problem

In order to achieve the aforementioned objects, the present invention proposes the following means.

(1) According to a first aspect of the present invention, there is provided a laminated core including a plurality of electrical steel sheets stacked in a thickness direction, wherein the electrical steel sheet includes an annular core back part and a plurality of tooth parts protruding from the core back part toward a radial direction and arranged at intervals in a circumferential direction of the core back part, and wherein among the plurality of electrical steel sheets, the tooth parts of the electrical steel sheets located at one side on the outside in a stacking direction are adhered to each other by an adhesion part provided between the tooth parts adjacent to each other in the stacking direction, the tooth parts of the electrical steel sheets located at the other side on the outside in the stacking direction are adhered to each other by an adhesion part provided between the tooth parts adjacent to each other in the stacking direction, and the tooth parts of the electrical steel sheets located at a center part in the stacking direction are not adhered to each other.

Generally, the adhesive shrinks at the time of curing. Therefore, compressive stress is applied to the electrical steel sheet as the adhesive is cured. When the compressive stress is applied, a strain is generated in the electrical steel sheet. When the strain is generated, the iron loss of the laminated core increases. In this case, there is a risk that magnetic properties of the laminated core may decrease.

According to this configuration, the tooth parts of the electrical steel sheets located at the center part in the stacking direction among the plurality of electrical steel sheets are not adhered to each other. Therefore, it is possible to suppress the strain from being generated in the tooth part of the electrical steel sheet located at the center part in the stacking direction. Thus, it is possible to improve magnetic properties of the laminated core compared to a case in which the tooth parts of all electrical steel sheets including those at the center part in the stacking direction are adhered to each other.

On the other hand, the tooth parts of the plurality of electrical steel sheets at one side and the other side of the laminated core in the stacking direction are adhered to each other. Therefore, it is possible to suppress the lifting (warping) of the tooth parts of the electrical steel sheets located at one side and the other side on the outside of the laminated core in the stacking direction, for example, compared to a case in which the tooth parts of all electrical steel sheets including those of one side and the other side on the outside of the laminated core in the stacking direction are not adhered to each other. Thus, it is possible to improve magnetic properties of the laminated core.

(2) In the laminated core according to (1), the number of the electrical steel sheets located at the center part in the stacking direction may be larger than the number of the electrical steel sheets located at one side on the outside in the stacking direction and the number of the electrical steel sheets located at the other side on the outside in the stacking direction.

Generally, strain due to the shrink of the adhesive is not generated in the tooth parts which are not adhered to each other by an adhesive. On the other hand, strain due to the shrink of the adhesive is generated in the tooth parts which are adhered to each other by an adhesive. According to this configuration, the number of the tooth parts in which the strain is not generated becomes larger than the number of the tooth parts located at one side and the other side on the outside in the stacking direction and in which the strain is generated. Therefore, it is possible to further reduce the strain generated in the whole laminated core.

(3) In the laminated core according to (1) or (2), the number of the electrical steel sheets located at one side on the outside in the stacking direction may be the same as the number of the electrical steel sheets located at the other side on the outside in the stacking direction.

According to this configuration, the thickness of one side on the outside of the laminated core in the stacking direction is the same as the thickness of the other side on the outside of the laminated core in the stacking direction. Further, the strain amount generated at one side on the outside of the laminated core in the stacking direction is the same as the strain amount generated at the other side on the outside of the laminated core in the stacking direction. Accordingly, it is possible to suppress the strain unevenness generated in the whole laminated core.

(4) In the laminated core according to any one of (1) to (3), a ratio of the number of the electrical steel sheets located at one side on the outside in the stacking direction with respect to the total number of the plurality of electrical steel sheets of the laminated core may be 1% or more and 10% or less.

When this ratio is less than 1%, the adhesion force of the adhesion part adhered to the tooth part located at one side on the outside in the stacking direction decreases. Therefore, it is difficult to maintain the shape of the laminated core as a whole. On the other hand, when this ratio exceeds 10%, the adhesion force of the adhesion part allowing the tooth parts located at one side on the outside in the stacking direction to be adhered to each other becomes saturated. When this ratio is 1% or more and 10% or less, it is possible to maintain the shape of the laminated core as a whole while suppressing the amount of the adhesion part used for adhering the tooth parts.

(5) In the laminated core according to any one of (1) to (4), the adhesion part may be provided on a whole surface of a plane to be adhered in the tooth part.

According to this configuration, it is possible to suppress the strain unevenness generated in the tooth part due to the adhesion part. Thus, it is possible to suppress the strain unevenness generated in the whole laminated core.

(6) In the laminated core according to any one of (1) to (4), the adhesion part may be provided on an outer peripheral edge of a plane to be adhered in the tooth part.

According to this configuration, it is possible to suppress the separation between the outer peripheral edges of the tooth parts adjacent to each other in the stacking direction to be adhered.

(7) In the laminated core according to any one of (1) to (6), the tooth parts of the electrical steel sheets located at the center part in the stacking direction may not be fastened and welded to each other, and the core back parts of the electrical steel sheets located at the center part in the stacking direction may not be adhered, fastened, and welded to each other.

Generally, when the tooth part and the core back part are fastened or welded to each other, an interlayer short circuit occurs in the tooth part and the core back part.

According to this configuration, since the tooth part and the core back part are not fastened and welded to each other, it is possible to suppress an interlayer short circuit occurring in the tooth parts and the core back parts of the electrical steel sheets located at the center part in the stacking direction.

Further, since the core back parts are not adhered to each other, it is possible to reduce the strain generated in the core back parts of the electrical steel sheets located at the center part in the stacking direction.

(8) In the laminated core according to any one of (1) to (7), the tooth parts of the electrical steel sheets located at one side on the outside in the stacking direction may not be fastened and welded to the tooth parts which are adjacent in the stacking direction, and the core back parts of the electrical steel sheets located at one side on the outside in the stacking direction may not be adhered, fastened, and welded to the core back parts adjacent in the stacking direction.

According to this configuration, since the tooth part and the core back part are not fastened and welded to each other, it is possible to suppress an interlayer short circuit occurring in the tooth parts and the core back parts of the electrical steel sheets located at one side on the outside in the stacking direction.

Further, since the core back parts are not adhered to each other, it is possible to reduce the strain generated in the core back parts of the electrical steel sheets located at one side on the outside in the stacking direction.

(9) In the laminated core according to any one of (1) to (8), an average thickness of the adhesion part may be 1.0 μm to 3.0 μm.

(10) In the laminated core according to any one of (1) to (9), an average tensile elastic modulus E of the adhesion part may be 1500 MPa to 4500 MPa.

(11) In the laminated core according to any one of (1) to (10), the adhesion part may be a room temperature adhesion type acrylic-based adhesive including SGA made of an elastomer-containing acrylic-based adhesive.

(12) According to a second aspect of the present invention, there is provided an electric motor including the laminated core according to any one of (1) to (11).

According to this configuration, it is possible to improve magnetic properties of the electric motor.

Effects of the Invention

According to the present invention, it is possible to improve magnetic properties.

EMBODIMENTS FOR IMPLEMENTING THE INVENTION

Hereinafter, a laminated core and an electric motor according to an embodiment of the present invention will be described with reference to the drawings.

Additionally, in this embodiment, a motor which is the electric motor, specifically, an AC motor will be described as an example. The AC motor is specifically a synchronous motor and is more specifically a permanent magnetic electric motor. This type of motor is suitably used in, for example, an electric vehicle or the like.

Figure 1:
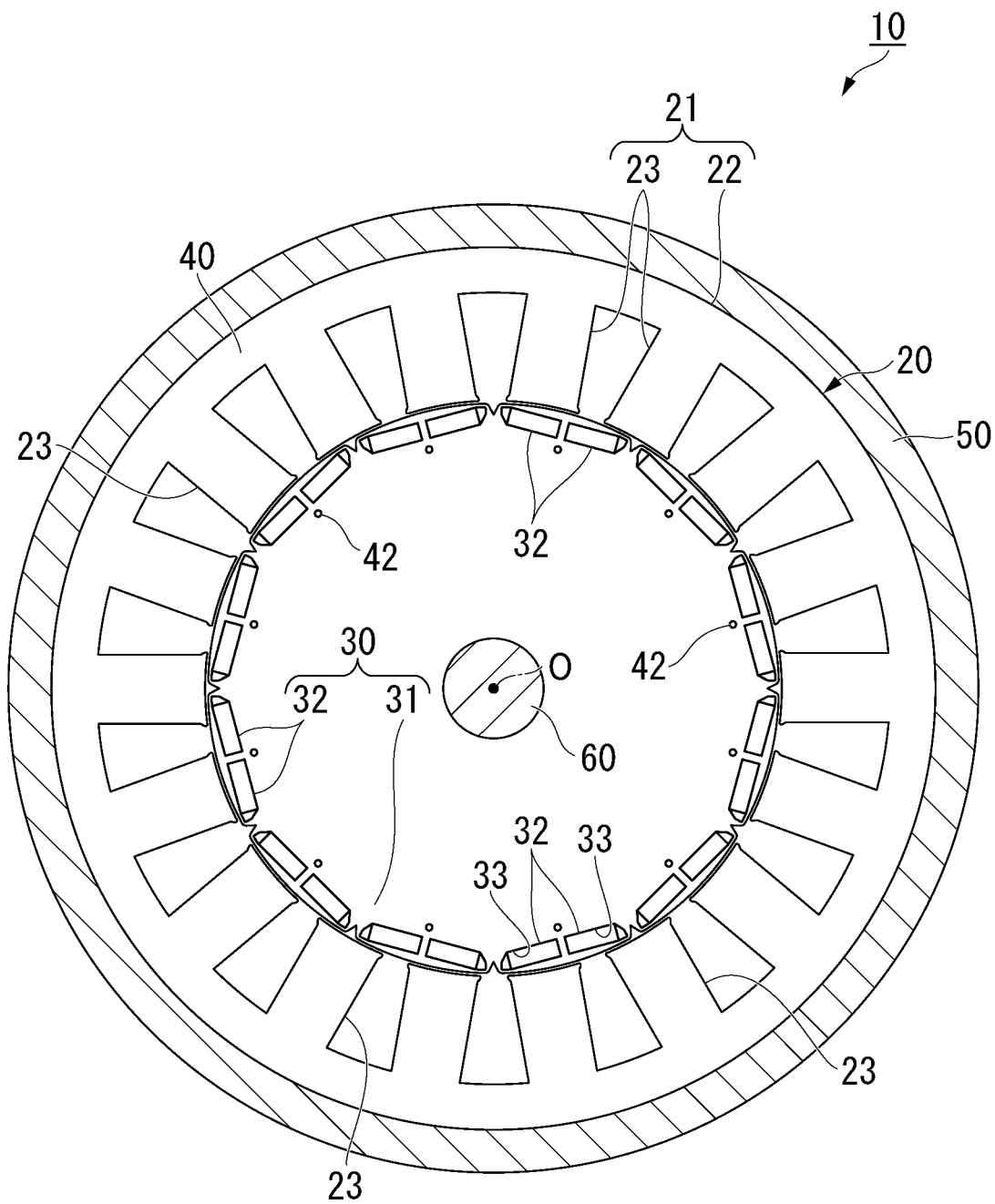
FIG. 1 is a cross-sectional view of an electric motor according to an embodiment of the present invention.
Figure 2:
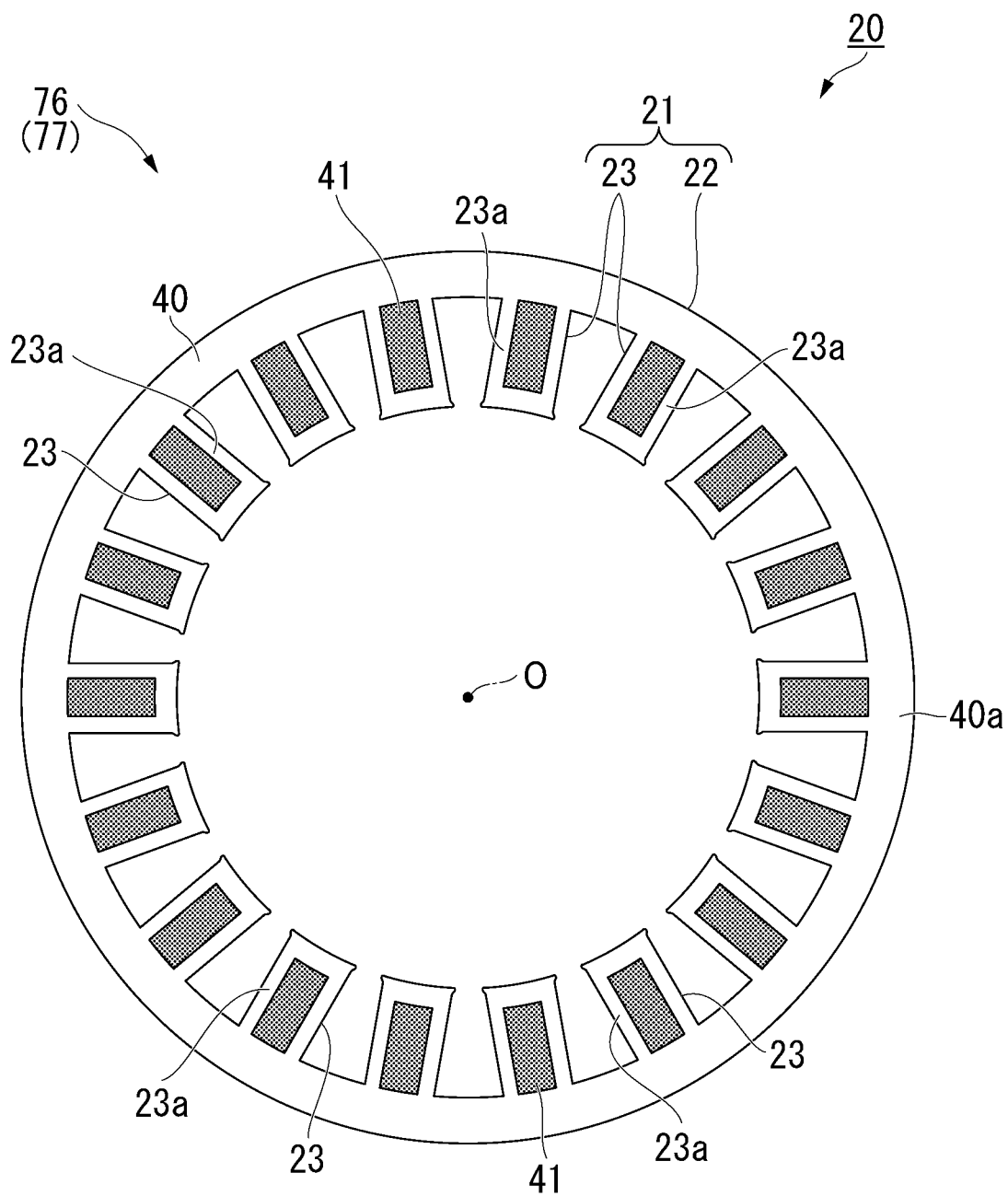
FIG. 2 is a plan view of a stator of the electric motor shown in FIG. 1.

As shown in FIGS. 1 and 2, an electric motor 10 includes a stator 20, a rotor 30, a casing 50, and a rotation shaft 60. The stator 20 and the rotor 30 are accommodated in the casing 50. The stator 20 is fixed to the casing 50.

In this embodiment, an inner rotor type electric motor in which the rotor 30 is located inside of the stator 20 is used as the electric motor 10. However, an outer rotor type electric motor in which the rotor 30 is located outside of the stator 20 may be used as the electric motor 10. Further, in this embodiment, the electric motor 10 is a 12-pole and 18-slot three-phase AC motor. However, for example, the number of poles, the number of slots, the number of phases, and the like can be changed as appropriate.

The stator 20 includes a stator core 21 and a winding (not shown).

The stator core 21 includes an annular core back part 22 and a plurality of tooth parts 23. Hereinafter, an axial direction (the direction of a central axis O of the stator core 21) of the stator core 21 (the core back part 22) is referred to as the axial direction. A radial direction (the direction orthogonal to the central axis O of the stator core 21) of the stator core 21 (the core back part 22) is referred to as the radial direction. A circumferential direction (the direction to orbit around the central axis O of the stator core 21) of the stator core 21 (the core back part 22) is referred to as the circumferential direction.

The core back part 22 is formed in an annular ring shape in a plan view of the stator 20 when viewed from the axial direction.

The plurality of tooth parts 23 protrude from the core back part 22 in the radial direction (toward the central axis O of the core back part 22 in the radial direction). The plurality of tooth parts 23 are arranged at equal intervals in the circumferential direction. In this embodiment, eighteen tooth parts 23 are provided at the intervals of the center angles of 20° around the central axis O. The plurality of tooth parts 23 are formed to have the same shape and the same size.

The winding is wound around the tooth part 23. The winding may be a concentrated winding or a distributed winding.

The rotor 30 is disposed on the inside of the stator 20 (the stator core 21) in the radial direction. The rotor 30 includes a rotor core 31 and a plurality of permanent magnets 32.

The rotor core 31 is formed in an annular shape (annular ring shape) to be arranged coaxially with the stator 20. The rotation shaft 60 is disposed inside the rotor core 31. The rotation shaft 60 is fixed to the rotor core 31.

The plurality of permanent magnets 32 are fixed to the rotor core 31. In this embodiment, a set of two permanent magnets 32 form one magnetic pole. A plurality of sets of permanent magnets 32 are arranged at equal intervals in the circumferential direction. In this embodiment, twelve sets (twenty four in total) of permanent magnets 32 are provided at the intervals of the center angles of 30° around the central axis O.

In this embodiment, an interior permanent magnet motor is employed as the permanent magnetic electric motor.

A plurality of through-holes 33 penetrating the rotor core 31 in the axial direction are formed in the rotor core 31. The plurality of through-holes 33 are provided to correspond to the plurality of permanent magnets 32. Each permanent magnet 32 is fixed to the rotor core 31 while being disposed inside the corresponding through-hole 33. For example, each permanent magnet 32 is fixed to the rotor core 31 in such a manner that the outer surface of the permanent magnet 32 is adhered to the inner surface of the through-hole 33 by an adhesive. Additionally, as the permanent magnetic electric motor, a surface permanent magnet motor may be used instead of the interior permanent magnet motor.

Both the stator core 21 and the rotor core 31 are laminated cores. The laminated cores are formed by stacking a plurality of electrical steel sheets 40.

Additionally, the stacking thickness of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the stacking thickness, the outer diameter, or the inner diameter of the stator core 21 and the stacking thickness, the outer diameter, or the inner diameter of the rotor core 31 are not limited to these values.

Here, the inner diameter of the stator core 21 is based on the tip of the tooth part 23 of the stator core 21. The inner diameter of the stator core 21 is the diameter of the virtual circle inscribed in the tips of all tooth parts 23.

Each of the electrical steel sheets 40 forming the stator core 21 and the rotor core 31 is formed, for example, by punching an electrical steel sheet serving as a base material. A known electrical steel sheet can be used for the electrical steel sheet 40. The chemical composition of the electrical steel sheet 40 is not particularly limited. In this embodiment, a non-grain-oriented electrical steel sheet is employed as the electrical steel sheet 40. As the non-grain-oriented electrical steel sheet, for example, a non-grain-oriented electrical steel strip of JIS (Japanese Industrial Standards) C2552: 2014 can be employed.

However, as the electrical steel sheet 40, a grain-oriented electrical steel sheet can be employed instead of the non-grain-oriented electrical steel sheet. As the grain-oriented electrical steel sheet, a grain-oriented electrical steel strip of JISC2553: 2012 can be employed.

In order to improve the workability of the electrical steel sheet and the iron loss of the laminated core, an insulation coating is provided on both surfaces of the electrical steel sheet 40. As a material constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid and (2) a complex of phosphate and silica, and the like. Examples of the organic resin include epoxy-based resin, acrylic-based resin, acrylic-styrene-based resin, polyester-based resin, silicone-based resin, fluorine-based resin, and the like.

In order to ensure the insulation performance between the electrical steel sheets 40 laminated with each other, the thickness of the insulation coating (thickness per one side of the electrical steel sheet 40) is preferably 0.1 μm or more.

On the other hand, the insulation effect becomes saturated as the insulation coating becomes thicker. Further, as the insulation coating becomes thicker, a space factor decreases and the performance as the laminated core decreases. Thus, the insulation coating should be as thin as possible to ensure the insulation performance. The thickness of the insulation coating (the thickness per one side of the electrical steel sheet 40) is preferably 0.1 μm or more and 5 μm or less. The thickness of the insulation coating is more preferably 0.1 μm or more and 2 μm or less.

As the electrical steel sheet 40 becomes thinner, the iron loss improvement effect becomes saturated. Further, the manufacturing costs of the electrical steel sheet 40 increase as the electrical steel sheet 40 becomes thinner. Therefore, the thickness of the electrical steel sheet 40 is preferably 0.10 mm or more in consideration of the iron loss improvement effect and the manufacturing costs.

On the other hand, when the electrical steel sheet 40 is too thick, the press punching work of the electrical steel sheet 40 becomes difficult.

Therefore, the thickness of the electrical steel sheet 40 is preferably 0.65 mm or less in consideration of the press punching work of the electrical steel sheet 40.

Further, the iron loss increases as the electrical steel sheet 40 becomes thick. Therefore, the thickness of the electrical steel sheet 40 is preferably 0.35 mm or less in consideration of the iron loss characteristics of the electrical steel sheet 40. The thickness of the electrical steel sheet 40 is more preferably 0.20 mm or 0.25 mm.

In consideration of the above points, the thickness of each electrical steel sheet 40 is, for example, 0.10 mm or more and 0.65 mm or less. The thickness of each electrical steel sheet 40 is preferably 0.10 mm or more and 0.35 mm or less and more preferably 0.20 mm or 0.25 mm. Additionally, the thickness of the electrical steel sheet 40 also includes the thickness of the insulation coating.

Figure 3:
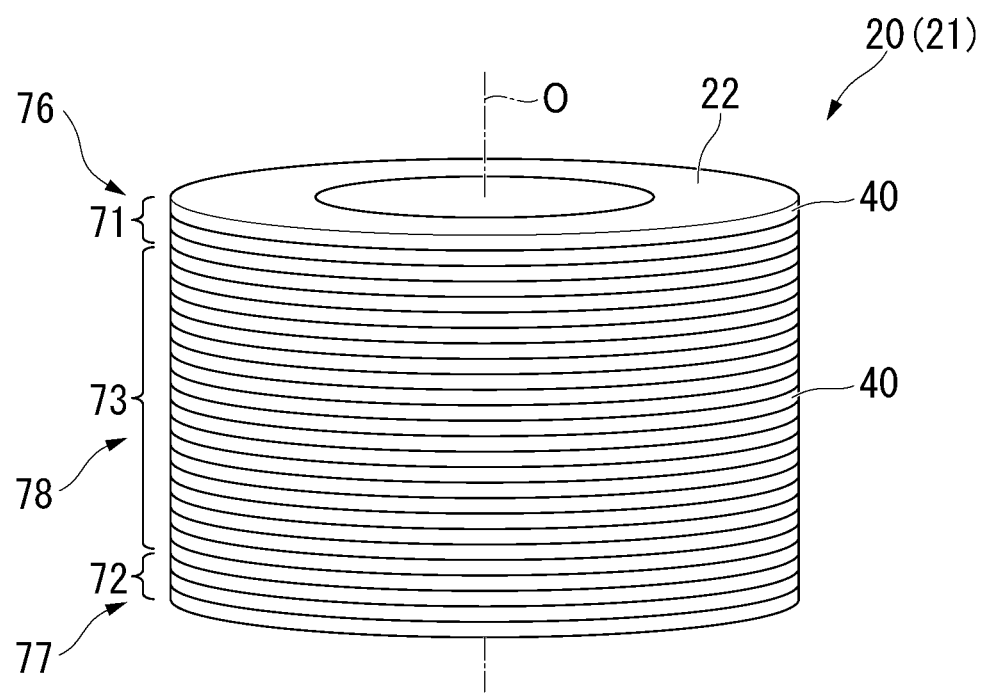
FIG. 3 is a perspective view of a stator core according to an embodiment of the present invention.

As shown in FIG. 3, the plurality of electrical steel sheets 40 constituting the stator core 21 are stacked in the thickness direction. The thickness direction is the thickness direction of the electrical steel sheet 40. The thickness direction corresponds to the stacking direction of the electrical steel sheet 40. Additionally, the tooth part 23 is not shown in FIG.

3 for convenience of description. The plurality of electrical steel sheets 40 are arranged coaxially with the central axis O. The electrical steel sheet 40 includes the core back part 22 and the plurality of tooth parts 23.

In the stator core 21, the tooth parts 23 of the electrical steel sheets (in FIG. 3, the electrical steel sheets located at an upper end part (a first end part) 71 of the stator core 21 in the stacking direction) 40 (hereinafter, referred to as a first steel sheet assembly 76) located at one side on the outside in the stacking direction among the plurality of electrical steel sheets 40 are adhered to each other by an adhesion part 41 (shown in FIG. 2) provided between the tooth parts 23 adjacent to each other in the stacking direction.

The tooth parts 23 of the electrical steel sheets 40 located at the upper end part 71 of the stator core 21 are fixed only by adhesion. The tooth parts 23 of the electrical steel sheets 40 located at the upper end part 71 of the stator core 21 are not fixed by other means (for example, fastening or the like). That is, as shown in FIG. 2, a surface (a first surface) 40a of the electrical steel sheet 40 located at the upper end part 71 of the stator core 21 is provided with an adhesion region provided with the adhesion part 41 and a non-adhesion region not provided with the adhesion part 41.

Additionally, the adhesion region of the electrical steel sheet 40 provided with the adhesion part 41 means a region which is not divided and is provided with a cured adhesive in the first surface 40a of the electrical steel sheet 40. Further, the non-adhesion region of the electrical steel sheet 40 not provided with the adhesion part 41 means a region in which a cured adhesive is not provided impartibly in the first surface 40a of the electrical steel sheet 40.

Further, in the stator core 21, the tooth parts 23 of the electrical steel sheets (in FIG. 3, the electrical steel sheets located at a lower end part (a second end part) 72 of the stator core 21 in the stacking direction) 40 (hereinafter, referred to as a second steel sheet assembly 77) located at the other side on the outside in the stacking direction among the plurality of electrical steel sheets 40 are adhered to each other by the adhesion part 41 provided between the tooth parts 23 adjacent to each other in the stacking direction.

The tooth parts 23 of the electrical steel sheets 40 located at the lower end part 72 of the stator core 21 are fixed only by adhering and are not fixed by other means (for example, fastening or the like). That is, the surface (the first surface) 40a of the electrical steel sheet 40 located at the lower end part 72 of the stator core 21 is provided with the adhesion region provided with the adhesion part 41 and the non-adhesion region not provided with the adhesion part 41.

Further, in the stator core 21, the tooth parts 23 of the electrical steel sheets (in FIG. 3, the electrical steel sheets located at a center part 73 of the stator core 21 in the stacking direction) 40 (hereinafter, referred to as a third steel sheet assembly 78) located at the center part 73 in the stacking direction among the plurality of electrical steel sheets 40 are not adhered to each other.

As shown in FIG. 2, the electrical steel sheets 40 (the tooth parts 23 of the first steel sheet assembly 76 and the tooth parts 23 of the second steel sheet assembly 77) located at the upper end part 71 and the lower end part 72 of the stator core 21 are not adhered to each other on the whole surface. These electrical steel sheets 40 are locally adhered to each other in the tooth part 23.

Here, an adhesive which is not divided and is cured between the electrical steel sheets 40 adjacent to each other in the stacking direction is referred to as one adhesion part 41.

In this embodiment, the electrical steel sheets 40 adjacent to each other in the stacking direction are adhered to each other by the adhesion part 41 at eighteen separate positions (eighteen tooth parts 23) in a plan view when the electrical steel sheet 40 is viewed from the stacking direction. Each adhesion part 41 is formed in a strip shape in a plan view and is disposed along the outer shape of the tooth part 23.

Here, the strip shape also includes a shape in which the width of the strip changes in the middle. For example, a shape in which round points are continuous in one direction without being divided is also included in a strip shape extending in one direction.

The adhesion part 41 is disposed at the center part of the surface (plane) 23a to be adhered of the tooth part 23. The adhesion part 41 extends to the outer peripheral edge continuous to the core back part 22 in the surface 23a.

Since the tooth part 23 is adhered by the adhesion part 41, the adhesion area (bonded area) can be easily secured compared to a case in which the tooth part 23 is fastened.

The number of the electrical steel sheets 40 constituting the upper end part 71 of the stator core 21 is two or more. The number of the electrical steel sheets 40 constituting the lower end part 72 of the stator core 21 is two or more. The number of the electrical steel sheets 40 constituting the center part 73 of the stator core 21 is two or more.

The number of the electrical steel sheets 40 constituting the center part 73 of the stator core 21 is preferably larger than the number of the electrical steel sheets 40 constituting the upper end part 71 of the stator core 21 and the number of the electrical steel sheets 40 constituting the lower end part 72 of the stator core 21.

That is, the number of the electrical steel sheets 40 constituting the center part 73 of the stator core 21 is preferably larger than the number of the electrical steel sheets 40 constituting the upper end part 71 of the stator core 21. Then, the number of the electrical steel sheets 40 constituting the center part 73 of the stator core 21 is preferably larger than the number of the electrical steel sheets 40 constituting the lower end part 72 of the stator core 21.

The number of the electrical steel sheets 40 constituting the upper end part 71 of the stator core 21 is preferably the same as the number of the electrical steel sheets 40 constituting the lower end part 72 of the stator core 21.

Further, the ratio of the number of the electrical steel sheets 40 located at the upper end part 71 of the stator core 21 in the stacking direction with respect to the total number (thickness) of the plurality of electrical steel sheets 40 of the stator core 21 is preferably 1% or more and 10% or less. This ratio is more preferably 2% or more and 8% or less and is most preferably 5%. The electrical steel sheets 40 located at the lower end part 72 of the stator core 21 in the stacking direction are also the same as the electrical steel sheets 40 located at the upper end part 71 of the stator core 21 in the stacking direction.

Figure 4:
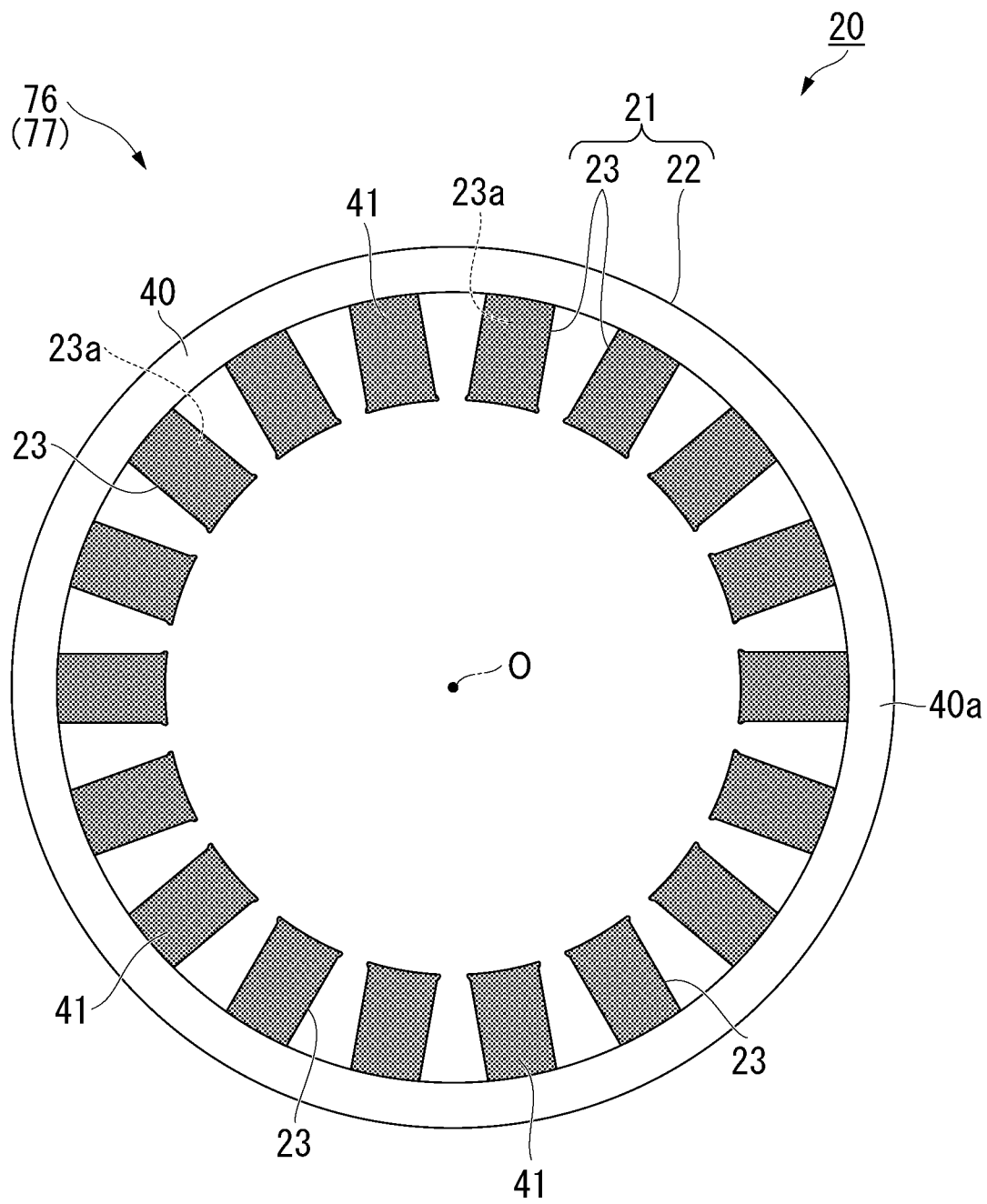
FIG. 4 is a plan view of the stator core according to an embodiment of the present invention.

The adhesion part 41 in the upper end part 71 and the lower end part 72 of the stator core 21 is preferably provided on the whole surface of the plane (the surface 23a shown in FIG. 2) adhered to the tooth part 23 of the electrical steel sheet 40 as shown in FIG. 4. That is, the whole surface of the surface 23a of the tooth part 23 of the electrical steel sheet 40 in the upper end part 71 and the lower end part 72 of the stator core 21 is preferably laminated through the adhesion part 41.

Figure 5:
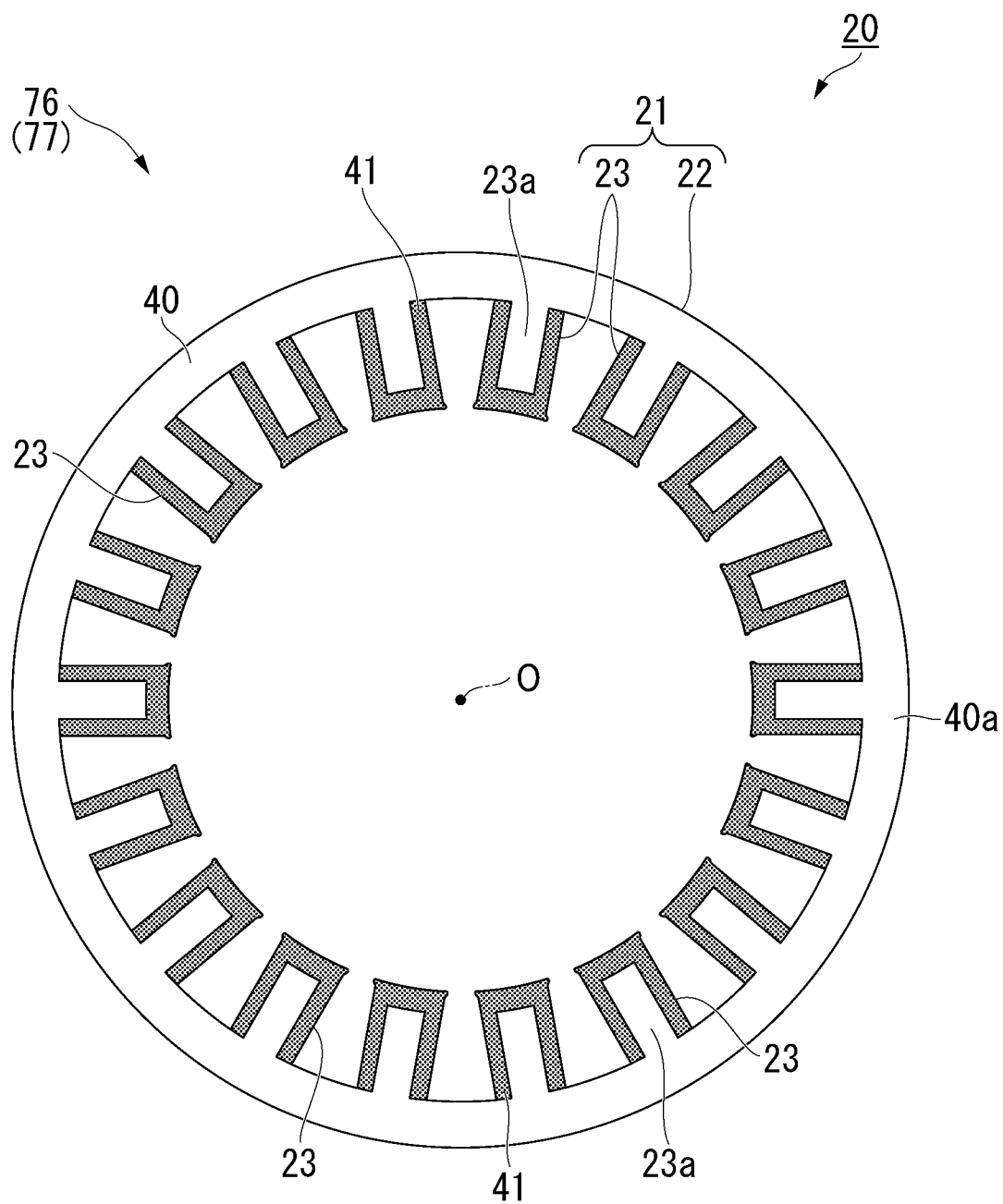
FIG. 5 is a plan view of the stator core according to an embodiment of the present invention.

Further, as shown in FIG. 5, the adhesion part 41 is preferably provided on the outer peripheral edge of the surface 23a of the tooth part 23. In this example, the adhesion part 41 is not provided in a part of the outer peripheral edge of the surface 23a. This part is a center part in the extension direction of the outer peripheral edge in a part connected to the core back part 22 in the outer peripheral edge.

For example, a thermosetting adhesive by polymer bonding or the like is used in the adhesion part 41. As the composition of the adhesive, (1) acrylic-based resin, (2) epoxy-based resin, (3) a composition of acrylic-based resin and epoxy-based resin, and the like are applicable.

As the adhesive, a radical polymerization type adhesive or the like in addition to thermosetting adhesive can be also used. From the viewpoint of productivity, a room temperature curing type (room temperature adhesion type) adhesive is preferable. The room temperature curing type adhesive is cured at 20° C. to 30° C. In the present specification, the numerical range represented by using "to" means a range including the numerical values before and after "to" as the lower limit value and the upper limit value.

As the room temperature curing type adhesive, an acrylic-based adhesive is preferable. As the representative acrylic-based adhesive, a second generation acrylic adhesive (SGA) or the like is known. All of an anaerobic adhesive, an instant adhesive, and an elastomer-containing acrylic-based adhesive can be used as long as the effects of the present invention are not impaired.

Additionally, the adhesive mentioned herein refers to the state before curing. When the adhesive is cured, the adhesion part 41 is obtained.

An average tensile elastic modulus E at a room temperature (20° C. to 30° C.) of the adhesion part 41 is set in the range of 1500 MPa to 4500 MPa. When the average tensile elastic modulus E of the adhesion part 41 is smaller than 1500 MPa, a problem arises in that the rigidity of the laminated core decreases. Therefore, the lower limit value of the average tensile elastic modulus E of the adhesion part 41 is set to 1500 MPa and more preferably 1800 MPa. In contrast, when the average tensile elastic modulus E of the adhesion part 41 exceeds 4500 MPa, a problem arises in that the insulation coating formed on the surface of the electrical steel sheet 40 is peeled off. Therefore, the upper limit value of the average tensile elastic modulus E of the adhesion part 41 is set to 4500 MPa and more preferably 3650 MPa.

Additionally, the average tensile elastic modulus E is measured by a resonance method. Specifically, the tensile elastic modulus is measured based on JISR1602: 1995.

More specifically, a measurement sample (not shown) is prepared first. This sample can be obtained by adhering between two electrical steel sheets 40 by an adhesive for a measurement object and curing the adhesive to form the adhesion part 41. When the adhesive is of a thermosetting type, this curing is performed by heating and pressurizing under the heating and pressurizing conditions in actual operation. On the other hand, when the adhesive is of a room temperature curing type, this curing is performed by pressurizing under a room temperature.

Then, the tensile elastic modulus for this sample is measured by a resonance method. A method of measuring the tensile elastic modulus according to the resonance method is performed based on JISR1602: 1995 as described above. Then, the tensile elastic modulus of the adhesion part 41 alone can be obtained by removing the influence of the electrical steel sheet 40 itself from the tensile elastic modulus (measured value) of the sample by calculation.

The tensile elastic modulus obtained from the sample in this way becomes equal to the average value of the whole stator core 21 which is a laminated core. Therefore, this numerical value is regarded as the average tensile elastic modulus E. The composition is set such that the average tensile modulus of elasticity E is almost unchanged at a stacking position in the stacking direction or at a circumferential position around the central axis of the stator core 21. Therefore, the average tensile elastic modulus E can be set to a value obtained by measuring the cured adhesion part 41 at the upper end position of the stator core 21.

As an adhering method using a thermosetting adhesive, for example, a method of applying an adhesive to the electrical steel sheet 40 and then adhering the adhesive by heating and/or press-stacking can be employed. In addition, as the heating means, for example, a heating method using a high temperature tank or an electric furnace or a direct energizing method is used. As the heating means, any method may be used.

In order to obtain stable and sufficient adhesion strength, the thickness of the adhesion part 41 is preferably 1 μm or more.

On the other hand, when the thickness of the adhesion part 41 exceeds 100 μm, an adhesion force becomes saturated. Further, as the adhesion part 41 becomes thick, a surface factor decreases and magnetic properties such as iron loss of the laminated core decrease. Thus, the thickness of the adhesion part 41 is 1 μm or more and 100 μm or less. The thickness of the adhesion part 41 is more preferably 1 μm or more and 10 μm or less.

In the description above, the thickness of the adhesion part 41 means the average thickness of the adhesion part 41.

The average thickness of the adhesion part 41 is preferably 1.0 μm or more and 3.0 μm or less. When the average thickness of the adhesion part 41 is smaller than 1.0 μm, a sufficient adhesion force cannot be secured as described above. Therefore, the lower limit value of the average thickness of the adhesion part 41 is 1.0 μm and more preferably 1.2 μm. In contrast, when the average thickness of the adhesion part 41 becomes thicker than 3.0 μm, a problem arises in that the strain amount of the electrical steel sheet 40 largely increases due to shrinkage at the time of thermosetting. Therefore, the upper limit value of the average thickness of the adhesion part 41 is 3.0 μm and more preferably 2.6 μm.

The average thickness of the adhesion part 41 is an average value of the stator core 21 as a whole. The average thickness of the adhesion part 41 is almost unchanged at the stacking position in the stacking direction or the circumferential position around the central axis of the stator core 21. Therefore, the average thickness of the adhesion part 41 can be set to the average value of the numerical values measured at ten or more positions in the circumferential direction at the upper end position of the stator core 21.

Additionally, the average thickness of the adhesion part 41 can be adjusted by changing, for example, the adhesive application amount. Further, the average tensile elastic modulus E of the adhesion part 41 can be adjusted by changing one or both of the heating and pressurizing conditions applied at the time of adhesion and the types of the curing agent, for example, in the case of the thermosetting adhesive.

The tooth parts 23 of the plurality of electrical steel sheets 40 constituting the center part 73 of the stator core 21 are not fixed (adhered) to each other by the adhesion part 41. The tooth parts 23 are not fixed (fastened) to each other by fastening (dowel). The tooth parts 23 are not fixed (welded) to each other by welding. The tooth parts 23 are not fixed to each other by any of means such as the adhesion part 41, fastening, and welding.

Further, the core back parts 22 of the plurality of electrical steel sheets 40 constituting the center part 73 of the stator core 21 are not fixed (adhered) to each other by the adhesion part 41. The core back parts 22 are not fixed (fastened) to each other by fastening (dowel). The core back parts 22 are not fixed (welded) to each other by welding. The core back parts 22 are not fixed to each other by any of means such as the adhesion part 41, fastening, and welding.

The tooth part 23 of the electrical steel sheet 40 constituting the upper end part 71 of the stator core 21 is not fixed (fastened) to the tooth part 23 which is adjacent in the stacking direction by fastening (dowel). The tooth parts 23 are not fixed (welded) to each other by welding.

The core back part 22 of the electrical steel sheet 40 constituting the upper end part 71 of the stator core 21 may be adhered to the core back part 22 which is adjacent in the stacking direction by the adhesion part 41 provided between the core back parts 22 adjacent to each other in the stacking direction. These core back parts 22 may not be adhered to each other. Further, the core back part 22 of the electrical steel sheet 40 constituting the upper end part 71 of the stator core 21 may be fixed by fastening (dowel) between the core back parts 22 adjacent to each other in the stacking direction. These core back parts 22 may not be fastened to each other. Further, the core back part 22 of the electrical steel sheet 40 constituting the upper end part 71 of the stator core 21 may be fixed by welding between the core back parts 22 adjacent to each other in the stacking direction. These core back parts 22 may not be welded to each other.

The tooth part 23 of the electrical steel sheet 40 constituting the lower end part 72 of the stator core 21 is not fixed (fastened) to the tooth part 23 which is adjacent in the stacking direction by fastening (dowel). The tooth parts 23 are not fixed (welded) to each other by welding.

The core back part 22 of the electrical steel sheet 40 constituting the lower end part 72 of the stator core 21 may be adhered by the adhesion part 41 provided between the core back parts 22 adjacent to each other in the stacking direction. These core back parts 22 may not be adhered to each other. Further, the core back part 22 of the electrical steel sheet 40 constituting the lower end part 72 of the stator core 21 may be fixed by fastening (dowel)between the core back parts 22 adjacent to each other in the stacking direction. These core back parts 22 may not be fastened to each other. Further, the core back part 22 of the electrical steel sheet 40 constituting the lower end part 72 of the stator core 21 may be fixed to each other by welding between the core back parts 22 adjacent to each other in the stacking direction. These core back parts 22 may not be welded to each other.

Additionally, in this embodiment, the plurality of electrical steel sheets 40 constituting the rotor core 31 may be fixed to each other by fastening 42 (dowel) (see FIG. 1). However, the plurality of electrical steel sheets 40 constituting the rotor core 31 may be stacked with the adhesion part 41 interposed therebetween.

Additionally, the laminated core such as the stator core 21 or the rotor core 31 may be formed by so-called rotationally-stacking.

Additionally, the tooth parts 23 of the electrical steel sheets 40 located at the upper end part 71 and the lower end part 72 of the stator core 21 in the stacking direction are adhered to each other by the adhesion part 41 provided between the tooth parts 23 adjacent to each other in the stacking direction. Since the tooth parts 23 are adhered to each other by the adhesion part 41, each of them is maintained in a constant shape.

On the other hand, the tooth parts 23 of the electrical steel sheets 40 located at the center part 73 of the stator core 21 in the stacking direction are sandwiched between the electrical steel sheets 40 located at the upper end part 71 and the lower end part 72 in the stacking direction of the stator core 21 maintained in a constant shape. Therefore, for example, when the axis of the stator core 21 is disposed along the vertical direction, the tooth parts 23 of the electrical steel sheets 40 located at the center part 73 of the stator core 21 in the stacking direction are pressed downward by the weight of the tooth parts 23 of the electrical steel sheets 40 located at the upper end part 71 of the stator core 21 in the stacking direction. Thus, the tooth parts 23 of the electrical steel sheets 40 located at the center part 73 of the stator core 21 in the stacking direction are maintained in a constant shape.

The stator core 21 with the aforementioned configuration is manufactured as below.

A predetermined number of the electrical steel sheets 40 in which an adhesive is applied to the tooth part 23 are stacked to form the electrical steel sheets 40 located at the upper end part 71 of the stator core 21 in the stacking direction. Similarly, a predetermined number of the electrical steel sheets 40 in which an adhesive is applied to the tooth part 23 are stacked to form the electrical steel sheets 40 located at the lower end part 72 of the stator core 21 in the stacking direction. When a room temperature curing type adhesive is used, the adhesive is cured at a room temperature so that the adhesion part 41 is obtained.

A predetermined number of the electrical steel sheets 40 not applied with an adhesive are stacked to form the electrical steel sheets 40 located at the center part 73 of the stator core 21 in the stacking direction.

The electrical steel sheets 40 located at the center part 73 of the stator core 21 in the stacking direction are sandwiched in the stacking direction between the electrical steel sheets 40 located at the upper end part 71 and the lower end part 72 of the stator core 21 in the stacking direction.

With the aforementioned steps, the stator core 21 is manufactured.

In the manufactured stator core 21, it is preferable to more reliably maintain the shape of the stator core 21 by sandwiching the core back part 22 from both sides in the stacking direction, for example, by a jig (not shown).

When the winding is wound around the tooth part 23 of the stator core 21 maintained in a constant shape by the jig, the stator 20 is manufactured. Even when the jig is removed from the stator 20, the shape of the stator core 21 is more reliably maintained by the winding.

The electric motor 10 can rotate at a rotation speed of 1000 rpm, for example, by applying an excitation current having an effective value of 10 A and a frequency of 100 Hz to each phase.

Generally, the adhesive shrinks at the time of curing. Therefore, compressive stress is applied to the electrical steel sheet 40 as the adhesive is cured. When the compressive stress is applied, a strain is generated in the electrical steel sheet 40. When the strain is generated, the iron loss of the stator core 21 increases. In this case, there is a risk that magnetic properties of the stator core 21 may decrease.

According to the stator core 21 of the aforementioned embodiment, the tooth parts 23 of the electrical steel sheets 40 located at the center part 73 (the third steel sheet assembly 78) in the stacking direction among the plurality of electrical steel sheets 40 are not adhered to each other. Therefore, it is possible to suppress the strain from being generated in the tooth parts 23 of the electrical steel sheets 40 located at the center part 73 in the stacking direction. Thus, it is possible to improve magnetic properties of the stator core 21 compared to a case in which the tooth parts of all electrical steel sheets including those at the center part in the stacking direction are adhered to each other.

On the other hand, only the tooth parts 23 of the plurality of electrical steel sheets 40 in the upper end part 71 of the stator core 21 (the first steel sheet assembly 76) and the lower end part 72 (the second steel sheet assembly 77) are adhered to each other. Therefore, it is possible to suppress the lifting (warping) of the tooth parts 23 of the electrical steel sheets 40 constituting the upper end part 71 and the lower end part 72 of the stator core 21, for example, compared to a case in which the tooth parts of all electrical steel sheets including those of one side and the other side of the stator core in the stacking direction are not adhered to each other. Thus, it is possible to improve magnetic properties of the stator core 21.

Further, the tooth parts 23 of the electrical steel sheets 40 located at the upper end part 71 and the lower end part 72 of the stator core 21 in the plurality of electrical steel sheets 40 are adhered to each other. On the other hand, the tooth parts 23 of the electrical steel sheets 40 located at the center part 73 in the stacking direction among the plurality of electrical steel sheets 40 are not adhered to each other. Accordingly, since the stator core 21 can be separated in the stacking direction by the electrical steel sheets 40 located at the center part 73 in the stacking direction, the stator core 21 does not form an integral structure.

Generally, in an integral structure, the resonance frequency is determined as a constant value. On the other hand, in a non-integral structure, the resonance frequency is not determined as a constant value and the structure is less likely to resonate. Thus, the stator core 21 of this embodiment can exhibit a resonance suppressing effect.

In the stator core 21 (the laminated core) according to this embodiment, the number of the electrical steel sheets 40 constituting the center part 73 of the stator core 21 is larger than the number of the electrical steel sheets 40 constituting the upper end part 71 of the stator core 21. Further, the number of the electrical steel sheets 40 constituting the center part 73 of the stator core 21 is larger than the number of the electrical steel sheets 40 constituting the lower end part 72 of the stator core 21.

Generally, strain due to the shrink of the adhesive is not generated in the tooth parts which are not adhered to each other by an adhesive. On the other hand, strain due to the shrink of the adhesive is generated in the tooth parts which are adhered to each other by an adhesive. In the stator core 21 according to this embodiment, the number of the tooth parts 23 without the strain is larger than the number of the tooth parts 23 with the strain located at the upper end part 71 and the lower end part 72 in the stacking direction. Thus, it is possible to reduce the strain generated in the whole stator core 21.

In the stator core 21 (the laminated core) according to this embodiment, the number of the electrical steel sheets 40 constituting the upper end part 71 of the stator core 21 is the same as the number of the electrical steel sheets 40 constituting the lower end part 72 of the stator core 21. Thus, the upper end part 71 and the lower end part 72 of the stator core 21 have the same thickness. Further, the upper end part 71 and the lower end part 72 of the stator core 21 also have the same strain amount. Accordingly, it is possible to suppress the strain unevenness generated in the whole stator core 21.

A ratio of the number of the electrical steel sheets 40 located at the upper end part 71 of the stator core 21 in the stacking direction with respect to the total number of the plurality of electrical steel sheets 40 of the stator core 21 is 1% or more and 10% or less. When the ratio is smaller than 1%, the adhesion force of the adhesion part 41 allowing the tooth parts 23 of the upper end part 71 of the stator core 21 in the stacking direction to be adhered to each other decreases. Therefore, it is difficult to maintain the shape of the stator core 21 as a whole. On the other hand, when the ratio exceeds 10%, the adhesion force of the adhesion part 41 allowing the tooth parts 23 of the upper end part 71 in the stacking direction to be adhered to each other becomes saturated. When this ratio is 1% or more and 10% or less, it is possible to maintain the shape of the stator core 21 as a whole while suppressing the amount of the adhesion part 41 used for adhering the tooth parts 23. This ratio is more preferably 2% or more and 8% or less.

In the stator core 21 (the laminated core) according to this embodiment, the adhesion part 41 is provided on the whole surface of the plane (the surface 23a) in the tooth part 23 of the electrical steel sheet 40 at the upper end part 71 and the lower end part 72 of the stator core 21. Accordingly, it is possible to suppress the strain unevenness generated in the tooth part 23 due to the adhesion part 41. Thus, it is possible to suppress the strain unevenness generated in the whole stator core 21.

In the stator core 21 (the laminated core) according to this embodiment, the adhesion part 41 at the upper end part 71 and the lower end part 72 of the stator core 21 is provided on the outer peripheral edge of the surface 23a of the tooth part 23 of the electrical steel sheet 40. Thus, it is possible to suppress the separation between the outer peripheral edges of the tooth parts 23 adhered and adjacent to each other in the stacking direction.

Generally, when the tooth parts and the core back parts are fastened or welded to each other, an interlayer short circuit occurs in the tooth parts and the core back parts.

In the stator core 21 (the laminated core) according to this embodiment, the tooth parts 23 of the electrical steel sheets 40 located at the center part 73 of the stator core 21 are not fastened and welded to each other. Then, the core back parts 22 of the electrical steel sheets 40 located at the center part 73 of the stator core 21 are not adhered, fastened, and welded to each other.

Since the tooth part 23 and the core back part 22 are not fastened and welded to each other, it is possible to suppress an interlayer short circuit occurring between the tooth part 23 and the core back part 22 of the electrical steel sheets 40 located at the center part 73 in the stacking direction.

Further, since the core back parts 22 are not adhered to each other, it is possible to reduce the strain generated in the core back parts 22 of the electrical steel sheets 40 located at the center part 73 in the stacking direction.

In the stator core 21 (the laminated core) according to this embodiment, the tooth parts 23 of the electrical steel sheets 40 at the upper end part 71 of the stator core 21 are not fastened and welded to each other. Then, the core back parts 22 of the electrical steel sheets 40 at the upper end part 71 of the stator core 21 may not be adhered, fastened, and welded to each other.

In this case, since the tooth part 23 and the core back part 22 are not fastened and welded to each other, it is possible to suppress an interlayer short circuit occurring in the tooth part 23 and the core back part 22 at the upper end part 71 of the stator core 21.

Further, since the core back parts 22 are not adhered to each other, the strain generated in the core back part 22 at the upper end part 71 of the stator core 21 can be reduced.

Since the electric motor 10 according to this embodiment includes the stator core 21 according to this embodiment, it is possible to improve magnetic properties of the electric motor 10.

Additionally, the technical scope of the present invention is not limited to the aforementioned embodiment and can be modified into various forms in the range not deviating from the gist of the present invention.

For example, the shape of the stator core is not limited to the form shown in the aforementioned embodiment. Specifically, the dimensions of the outer diameter and the inner diameter of the stator core, the stacking thickness, the number of slots, the dimensional ratio between the circumferential direction and the radial direction of the tooth part, the dimensional ratio between the tooth part and the core back part in the radial direction, and the like can be arbitrarily designed according to the characteristic of the desired electric motor.

In the rotor of the aforementioned embodiment, a set of two permanent magnets 32 forms one magnetic pole, but the present invention is not limited thereto. For example, one permanent magnet 32 may form one magnetic pole and three or more permanent magnets 32 may form one magnetic pole.

The tooth parts 23 of the electrical steel sheets 40 located at the center part 73 of the stator core 21 in the stacking direction may be fastened to the tooth parts 23 which are adjacent in the stacking direction. This tooth part 23 may be welded to the tooth part 23 which is adjacent in the stacking direction.

The core back parts 22 of the electrical steel sheets 40 located at the center part 73 of the stator core 21 in the stacking direction may be adhered to the core back parts 22 which are adjacent in the stacking direction. This core back part 22 may be fastened to the core back part 22 which is adjacent in the stacking direction. This core back part 22 may be welded to the core back part 22 which is adjacent in the stacking direction.

The tooth parts 23 of the electrical steel sheets 40 located at the upper end part 71 of the stator core 21 in the stacking direction may be fastened to the tooth parts 23 which are adjacent in the stacking direction. This tooth part 23 may be welded to the tooth part 23 which is adjacent in the stacking direction.

The tooth parts 23 of the electrical steel sheets 40 located at the lower end part 72 of the stator core 21 in the stacking direction may be fastened to the tooth parts 23 which are adjacent in the stacking direction. This tooth part 23 may be welded to the tooth part 23 which is adjacent in the stacking direction.

In the aforementioned embodiment, an example in which the electric motor is a permanent magnetic electric motor has been described, but the structure of the electric motor is not limited thereto as shown below. The structure of the electric motor may further employ various known structures not shown below.

In the aforementioned embodiment, an example in which the synchronous motor is a permanent magnetic electric motor has been described. However, the present invention is not limited thereto. For example, the electric motor may be a reluctance motor or an electromagnet field motor (a wound-field motor).

In the aforementioned embodiment, an example in which the AC motor is a synchronous motor has been described. However, the present invention is not limited thereto. For example, the electric motor may be an induction motor.

In the aforementioned embodiment, an example in which a motor is the AC motor has been described. However, the present invention is not limited thereto. For example, the electric motor may be a DC motor.

In the aforementioned embodiment, an example in which the electric motor is a motor has been described. However, the present invention is not limited thereto. For example, the electric motor may be a generator.

In the aforementioned embodiment, a case in which the laminated core according to the present invention is applied to the stator core has been exemplified. The laminated core according to the present invention can also be applied to the rotor core.

In addition, it is possible to replace the components in the above embodiment with well-known components as appropriate without departing from the gist of the present invention. Further, the aforementioned modified examples may be appropriately combined with each other.

INDUSTRY APPLICABILITY

According to the present invention, it is possible to provide a laminated core having improved magnetic properties and an electric motor including the laminated core. Thus, the industrial applicability is great.

BRIEF DESCRIPTION OF THE REFERENCE SYMBOLS

10 Electric motor
20 Stator
21 Stator core (laminated core)
22 Core back part
23 Tooth part
23a Surface (plane)
30 Rotor
31 Rotor core (laminated core)
32 Permanent magnet
33 Through-hole
40 Electrical steel sheet
41 Adhesion part
50 Casing
60 Rotation shaft

The invention claimed is:

1. A laminated core comprising:
a plurality of electrical steel sheets stacked in a thickness direction,
wherein the electrical steel sheet includes an annular core back part and a plurality of tooth parts protruding from the core back part toward a radial direction and arranged at intervals in a circumferential direction of the core back part,
wherein among the plurality of electrical steel sheets, the tooth parts of the electrical steel sheets located at one side on the outside in a stacking direction are adhered to each other by an adhesion part provided between surfaces where the tooth parts adjacent to each other in the stacking direction face each other, the tooth parts of the electrical steel sheets located at the other side on the outside in the stacking direction are adhered to each other by an adhesion part provided between surfaces where the tooth parts adjacent to each other in the stacking direction face each other, and the tooth parts of the electrical steel sheets located at a center part in the stacking direction are not adhered to each other,
wherein the number of the electrical steel sheets located at the center part in the stacking direction is larger than the number of the electrical steel sheets located at one side on the outside in the stacking direction and the number of the electrical steel sheets located at the other side on the outside in the stacking direction, and wherein a ratio of the number of the electrical steel sheets located at one side on the outside in the stacking direction with respect to the total number of the plurality of electrical steel sheets of the laminated core and a ratio of the number of the electrical steel sheets located at the other side on the outside in the stacking direction with respect to the total number of the plurality of electrical steel sheets of the laminated core are 1% or more and 10% or less.

2. The laminated core according to claim 1,
wherein the number of the electrical steel sheets located at one side on the outside in the stacking direction is the same as the number of the electrical steel sheets located at the other side on the outside in the stacking direction.

3. The laminated core according to claim 1,
wherein the adhesion part is provided on a whole surface of a plane to be adhered in the tooth part.

4. The laminated core according to claim 1,
wherein the adhesion part is provided on an outer peripheral edge of a plane to be adhered in the tooth part.

5. The laminated core according to claim 1,
wherein the tooth parts of the electrical steel sheets located at the center part in the stacking direction are not fastened and welded to each other, and wherein the core back parts of the electrical steel sheets located at the center part in the stacking direction are not adhered, fastened, and welded to each other.

6. The laminated core according to claim 1,
wherein the tooth parts of the electrical steel sheets located at one side on the outside in the stacking direction are not fastened and welded to the tooth parts which are adjacent in the stacking direction, and wherein the core back parts of the electrical steel sheets located at one side on the outside in the stacking direction are not adhered, fastened, and welded to the core back parts adjacent in the stacking direction.

7. The laminated core according to claim 1
wherein an average thickness of the adhesion part is 1.0 μm to 3.0 μm.

8. The laminated core according to claim 1,
wherein an average tensile elastic modulus E of the adhesion part is 1500 MPa to 4500 MPa.

9. The laminated core according to claim 1,
wherein the adhesion part is a room temperature adhesion type acrylic-based adhesive including SGA made of an elastomer-containing acrylic-based adhesive.

10. An electric motor comprising:
the laminated core according to claim 1.

* * * * *